United States Patent [19]

Imai

[11] 4,390,250
[45] Jun. 28, 1983

[54] PHOTOGRAPHIC LENS SYSTEM

[75] Inventor: Toshihiro Imai, Hachiouji, Japan

[73] Assignee: Olympus Optical Co., Ltd., Tokyo, Japan

[21] Appl. No.: 283,460

[22] Filed: Jul. 15, 1981

[30] Foreign Application Priority Data

Jul. 17, 1980 [JP] Japan .................................. 55-97782

[51] Int. Cl.³ .......................... G02B 9/60; G02B 9/62
[52] U.S. Cl. ..................................... 350/465; 350/464
[58] Field of Search ................ 350/464, 465, 455, 454

[56] References Cited

U.S. PATENT DOCUMENTS 4,204,747  5/1980  Imai .................................... 350/465
4,235,521  11/1980  Imai .................................... 350/465

FOREIGN PATENT DOCUMENTS

47-19387  6/1972  Japan .
54-76147  6/1979  Japan .

*Primary Examiner*—John K. Corbin
*Assistant Examiner*—Rebecca D. Gass
*Attorney, Agent, or Firm*—Cushman, Darby & Cushman

[57] ABSTRACT

A photographic lens system for use in a compact camera, having an angular field of view of 60° to 70° and aperture ratio of F/2.8 and comprising a first lens component of a positive meniscus lens with its convex surface on the object side, a second lens component of a biconcave lens, a third lens component consisting of a biconvex lens and a small power positive or negative lens located adjacent the biconcave lens with an air space and having a positive refracting power as a whole, a fourth lens component of a negative meniscus lens with its convex surface on the image side, and a fifth lens component of a positive meniscus lens with a convex surface on the image side.

12 Claims, 11 Drawing Figures

PHOTOGRAPHIC LENS SYSTEM

BACKGROUND OF THE INVENTION (a) Field of the invention

The present invention relates to a photographic lens system, for use in a compact camera having a range finder and using a 35 mm film, and more particularly to a lens system having an angular field of view of 60° to 70° and an aperture ratio of F/2.8, the length from the first lens surface to the film surface being almost as short as the overall focal length.

(b) Description of the prior art

Conventionally, for the purpose of making compact a lens such as described above, a Tessar type lens system with a rear aperture stop has been adopted. However, in a lens system of Tessar type with a rear aperture stop (as described, for example, in Japanese Published Examined Patent Application No. 19387/72), the length from the first lens surface to the film surface had to be limited to a length in the order of 42 mm for use in a 35 mm film.

In order to eliminate this disadvantage, the inventor of the present application has designed a very compact lens system and has filed it as a Japanese patent application (See Japanese Published Unexamined Patent Application No. 76147/79). In this lens system, the length from the first lens surface to the film surface is made so short as to be about the same as the focal length.

However, in either of the lens system disclosed in the above mentioned Japanese Published Examined Patent Application No. 19387/72 and Japanese Published Uniexamined Patent Application No. 76147/79, there have been defects that, as the stop is not positioned in the middle of the lens system, it is difficult to well correct various aberrations and, when a small stop aperture is selected, no sufficient light amount of the marginal part of the image field will be obtained.

The present invention is to provide a very compact photographic lens system wherein the length from the first lens surface to the film surface is not more than 35 mm and various aberations are well corrected not only in the central part but also in the marginal part of the image plane.

In the photographic lens system disclosed in the above mentioned Japanese Published Unexamined Patent Application No. 76147/79, even if the stop located between the third lens component and the fourth lens component is intended to be moved toward the object side in order to be positioned substantially in the middle of the lens system, there will not be space in which the stop can be arranged. Therefore, in this known lens system, it is impossible to substantially symmetrically arrange the respective lens components, hence the above described defects. That is to say, in this known lens system, the same as in the lens system disclosed in Japanese Publish Examined Patent Application No. 19387/72, the pencil of rays is asymmetrical with respect to the center of the stop and, as a result, it is hard to correct the aberrations in the formation. Further, it is difficult to well balance the corrections of the aberrations when the stop aperture is fully opened and when it is made small and no sufficient light amount of the marginal part of the image field can be obtained.

Figure 2:
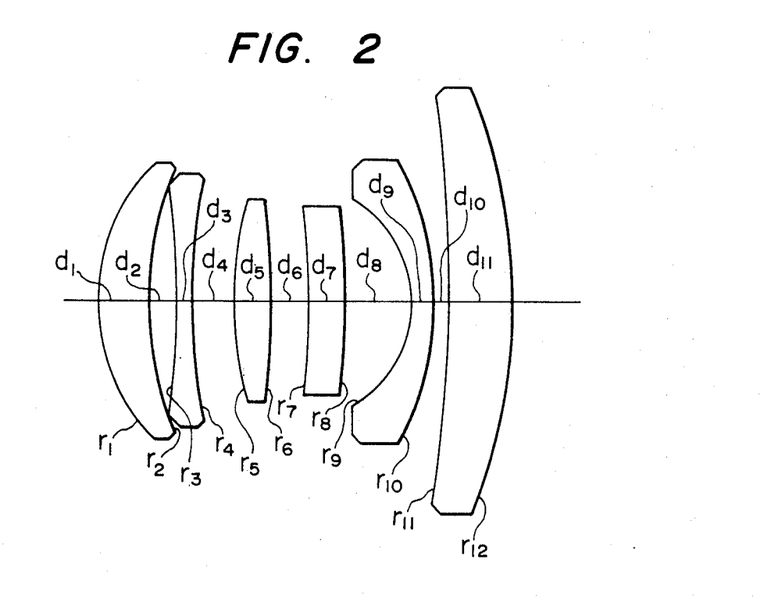
FIG. 2 is a sectional view of the photographic lens system according to the present invention.
Figure 3:
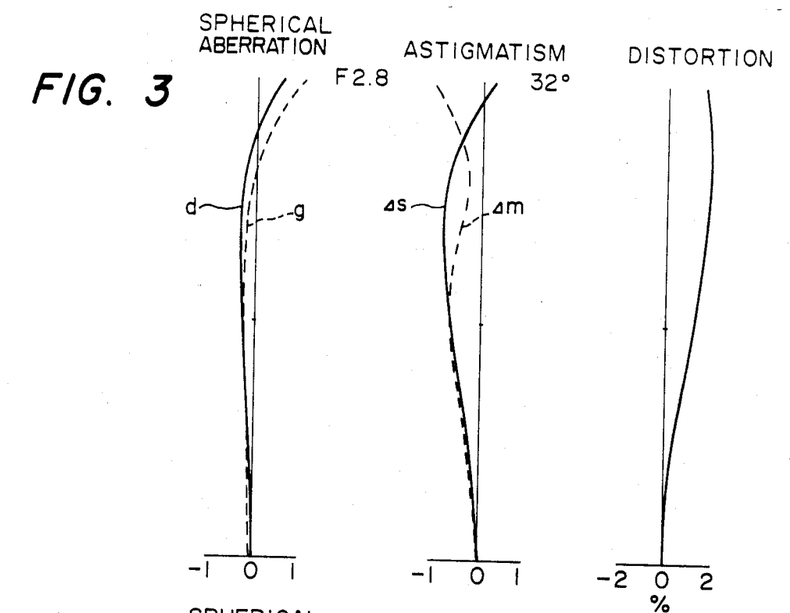
Figure 4:
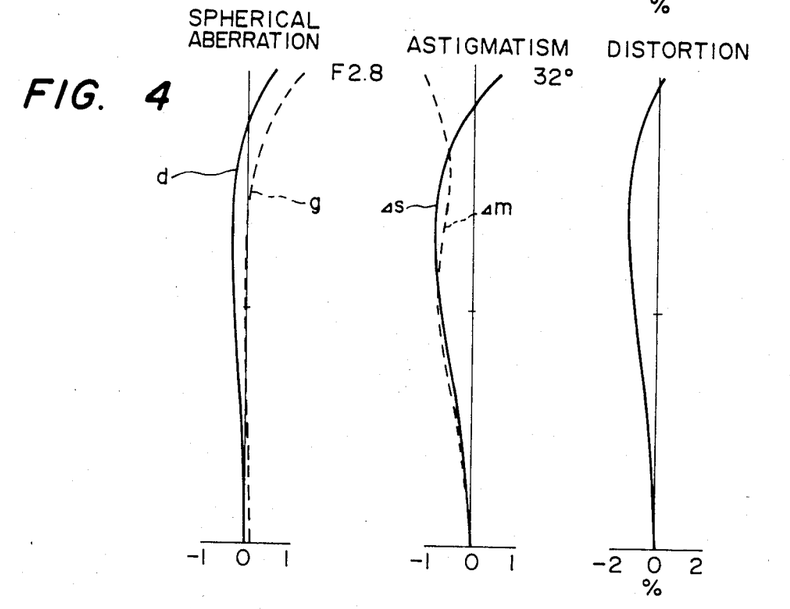
Figure 5:
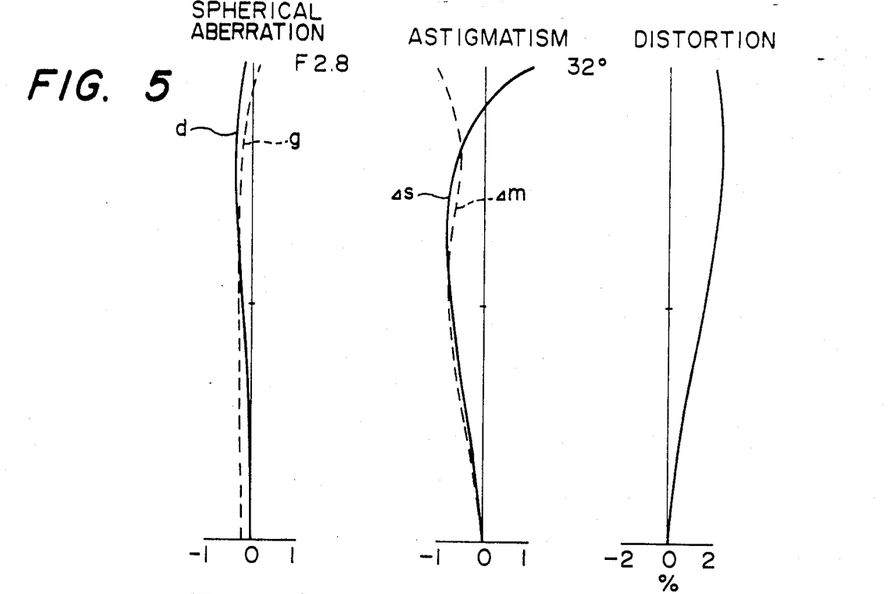
Figure 6:
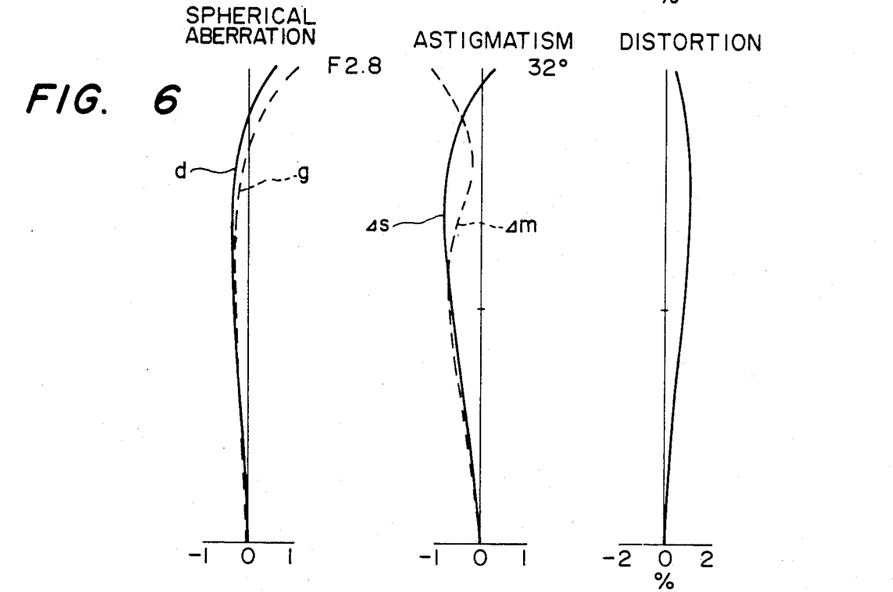
Figure 7:
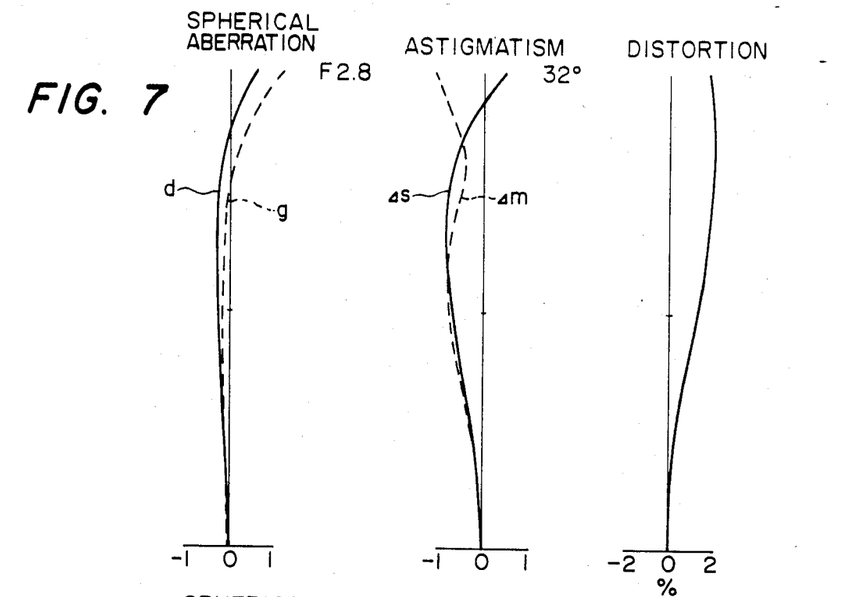
Figure 8:
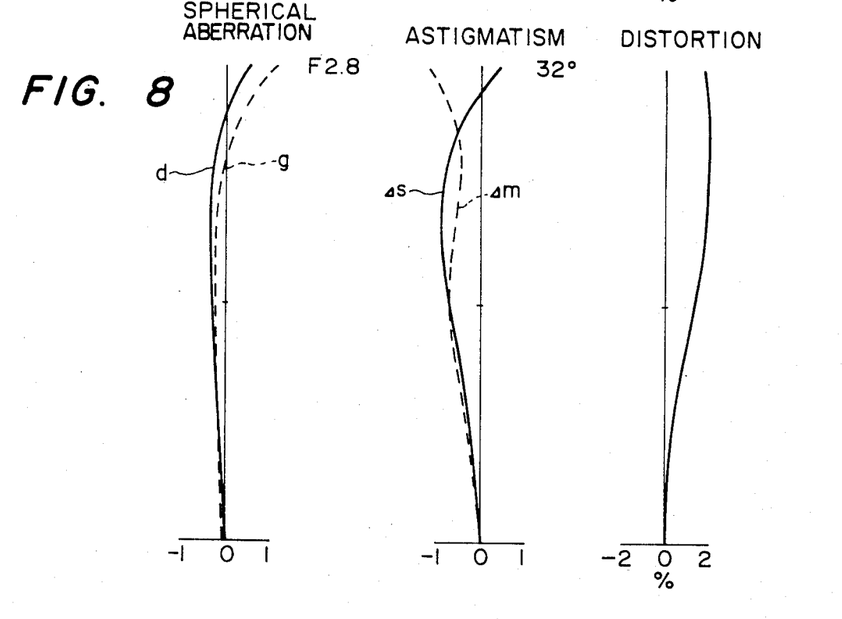
Figure 9:
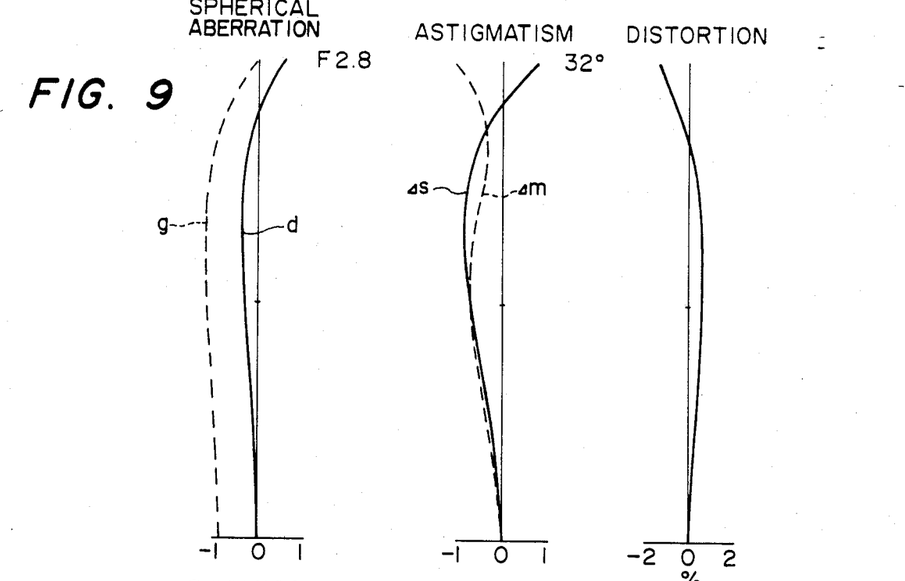
Figure 10:
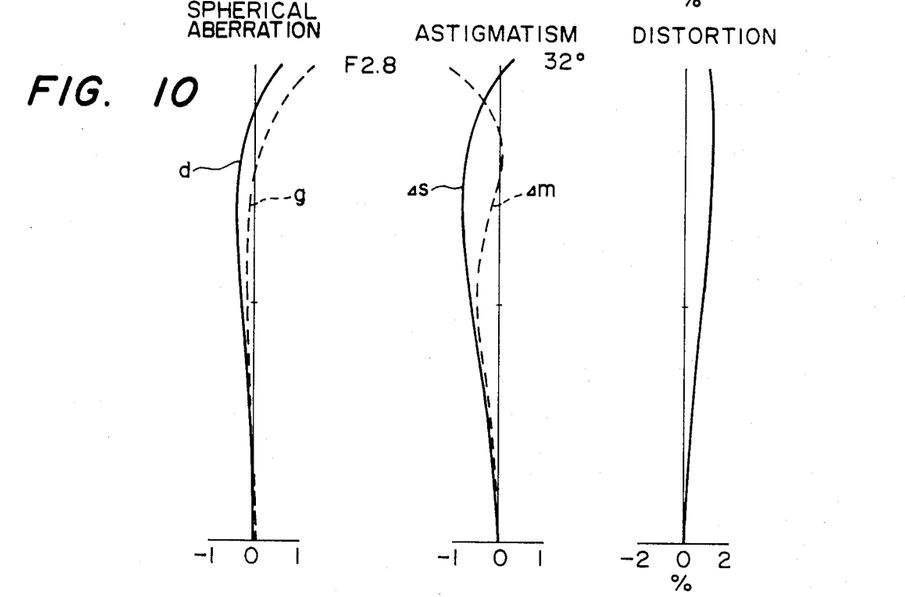
Figure 11:
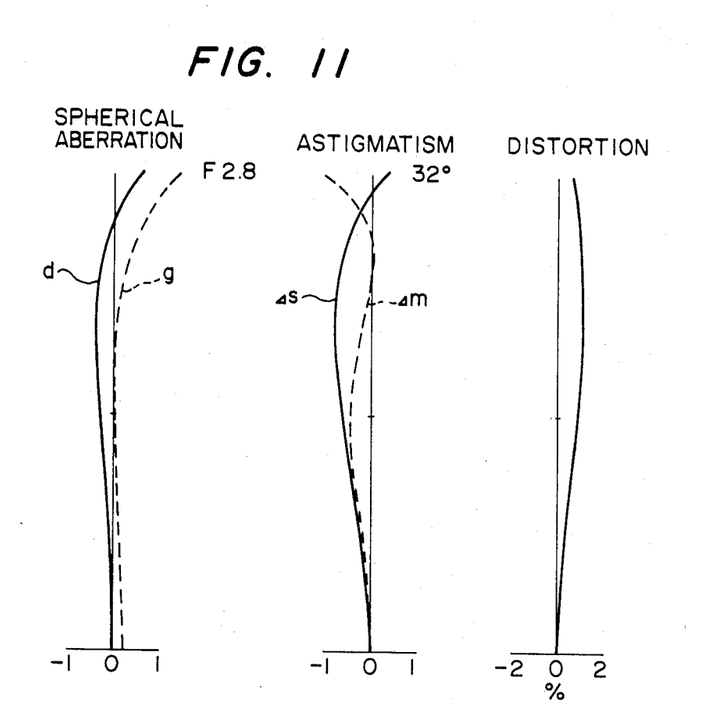

In the lens system according to the present invention, in order to position the stop toward the object side as much as possible, the third lens component which is a positive lens is separated into two lens elements. There is provided a space in which the stop can be arranged between these two separated lens elements, hence the lens system of such formation as is shown in FIG. 2. The power distribution to the respective lens components is the same as in the photographic lens system disclosed in Japanese Published Unexamined Patent Application No. 76147/79. That is to say, the power distribution is so made as to satisfy the later described conditions (1) and (2) and the features (of being of a wide angle and yet very compact) of the above mentioned known photographic lens system are perfectly provided.

The means for obtaining a lens system provided with the above mentioned features shall be explained in the following.

In order to shorten the total length of the lens system, there have been known two methods, one is to shorten the focal length of the lens system and the other is to make the telephoto ratio small (a proportion of the length from the first lens surface to the film surface, to the focal length). In order to make the total length of the lens system markedly short as described above, it is necessary both to shorten the focal length and to make the telephoto ratio small. In order to make the telephoto ratio small, there may be adopted a telephoto type lens system in which a negative lens is arranged in the rear portion of the lens system. However, in order to shorten the focal length in such a telephoto type lens system, it is necessary to secure good lens characteristics over an angular field of view wider than 60° which was inconceivable in a conventional telephoto type lens system.

SUMMARY OF THE INVENTION

According to the present invention, on one hand, a telephoto type lens system is adopted in order to make the telephoto ratio small and, on the other hand, the focal length in the lens system is made as short as possible but the image quality is kept good over a wide angular field of view so that, when they are well balanced, enables provision of a very compact photographic lens system having superior characteristics can be provided.

The photographic lens system according to the present invention comprises a first lens component of a positive meniscus lens with its convex surface on the object side, a second lens component of biconcave lens, a third lens component consisting of a biconvex lens and a smaller power positive or negative lens located adjacent the biconcave lens with an air space and having a positive refracting power as a whole, a fourth lens component of a negative meniscus lens with its convex surface on the image side, and a fifth lens component of a positive meniscus lens with a convex surface on the image side, said lens system satisfying the following conditions:

$$1.2 < f/f_{123} < 1.8 \tag{1}$$

$$-1.3 < f/f_{45} < -0.35 \tag{2}$$

$$0.16 < d_{567}/f < 0.23 \tag{3}$$

$$0.09 < d_8/f < 0.14 \tag{4}$$

wherein the reference symbol $f_{123}$ represents the composite focal length of the first, second and third lens components, the symbol $f_{45}$ represents the composite focal length of the fourth and fifth lens component, the symbol $d_{567}$ represents the length ($d_5 + d_6 + d_7$) from the object side surface to the image side surface of the third lens component, the symbol $d_8$ represents the axial air space between the third and fourth lens components, and the symbol f represents the focal length of the entire lens system.

Further objects and advantages will be apparent in the arrangements as set forth in the following description taken together with the accompanying drawings.

DESCRIPTION OF THE DRAWINGS

FIGS. 3 through 11 are graphs illustrating conditions of abberations of the first through ninth embodiments, respectively.

DESCRIPTION OF THE PREFERRED EMBODIMENTS

Figure 1:
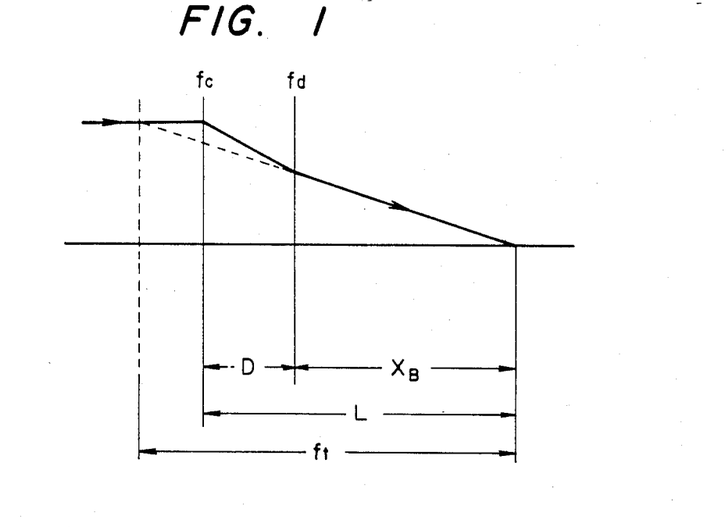
FIG. 1 is a view for explaining the principle of the present invention.

In the photographic lens system according to the present invention, a telephoto type lens system is adopted with a front lens group of a convergent lens type and a rear lens group of a dispersive type. As shown in FIG. 1, when a composite focal length of the front lens group is represented by $f_c$, a composite focal length of the rear lens group by $f_d$, a focal length of the entire lens system by $f_t$, the interval of principal points between the front and rear lens groups by D, the length from the principale point of the rear lens group to the film surface by $X_B$ and the length from the principal point of the front lens group to the film surface by L, the telephoto ratio R in the paraxial optical system can be obtained as follows:

$$L = D + X_B$$

$$\frac{1}{f_d} = -\frac{1}{f_c - D} + \frac{1}{X_B}$$

thus, $$\frac{1}{X_B} = \frac{1}{f_c - D} + \frac{1}{f_d} = \frac{f_d + f_c - D}{f_d(f_c - D)}$$

$$\frac{1}{f_t} = \frac{1}{f_c} + \frac{1}{f_d} - \frac{D}{f_c \cdot f_d}$$

therefore, $$R = \frac{L}{f_t} = \frac{D + X_B}{f_t} \quad (a)$$

$$= \left(\frac{1}{f_c} + \frac{1}{f_d} - \frac{D}{f_c \cdot f_d}\right) \left(D + \frac{f_d(f_c - D)}{f_d + f_c - D}\right)$$

$$= \left(\frac{f_d + f_c - D}{f_c \cdot f_d}\right) D - \frac{D}{f_c} + 1$$

$$= \frac{D}{f_d}\left(1 - \frac{D}{f_c}\right) + 1$$

$$\frac{1}{f_t} = \frac{f_d + f_c - D}{f_c \cdot f_d}$$

therefore, $$R = \left(\frac{f_d + f_c - D}{f_c \cdot f_d}\right) D - \frac{D}{f_c} + 1 \quad (b)$$

$$= \frac{D}{f_t} - \frac{D}{f_c} + 1$$

$$= \frac{D}{f_t}\left(1 - \frac{f_t}{f_c}\right) + 1$$

The petzval's sum is a parameter which can show a curvature of field and it has been known as can be represented by the following expression (c).

$$P = \sum_i \frac{1}{n_i f_i} \quad (c)$$

In the expression (b) among these expressions (a), (b), and (c), $(1 - f_t/f_b)$ is a negative value in the telephoto type lens system so that it is necessary to make $f_t/f_c$ large in order to make the telephoto ratio small. According to the present invention, as shown in condition (1), the telephoto ratio is intended to be made small be making $f_t/f_c$ (that is, $f/f_{123}$) larger than 1.2, and when $f/f_{123}$ is smaller than 1.2, it is impossible to make the telephoto ratio R small.

In the expression (a), the total value of $(D/f_d)(1 - D/f_c)$ is in the negative because $f_d$ is in the negative value so that $|1/f_d|$ may be made large in order to make the telephoto ratio R small. Thus, according the present invention, the telephoto radio R is intended to be made small by making $f/f_{45}$ smaller than $-0.35$. That is, it becomes impossible to make the telephoto ratio small if $f/f_{45}$ is larger than $-0.35$.

As seen from the expression (b), the telephoto ratio R becomes small if D is made larger so that, according to the present invention, $d_8/f$ is made larger than 0.09, and $d_8$ which corresponds to D is made large. Therefore, when $d_8/f$ is smaller than 0.09, the telephoto ratio becomes large and the light amount of the marginal part of the image field becomes insufficient.

Next, in order to secure good lens characteristics over an angular field of view wider than 60° in the telephoto type lens system, it is necessary that a curvature of field and an astigmatic difference be of small values. For the purpose of achieving a good condition of the curvature of field, it is necessary to make the focal length of the front convergent lens group as long as possible. Therefore, as shown in the condition (1), it is necessary that $f/f_{123}$ be smaller than 1.8. If the upper limit under this condition (1) is exceeded, the curvature of field becomes large. In order to make the curvature of field even smaller, it is desirable that each of the refractive indices $n_1$, $(\frac{1}{2})(n_3+n_4)$ and $n_6$ of the first, third and fifth lens components which are positive lenses in the lens system is larger than 1.7. According to the present invention, $d_{567}/f$ is made larger than 0.16 in order to make the astigmatic difference small over whole angular field of view and in order to incorporate the stop mechanism. When $d_{567}/f$ becomes smaller than 0.16, the astigmatic difference becomes large and a sufficient space between two lens elements of the third lens component will not be able to be kept to incorporate the stop mechanism. However, when $d_{567}/f$ becomes larger than 0.23 because of $d_5$ being too thick, the total length of the lens system becomes long and a sufficient marginal quantity of light cannot be obtained. Therefore, as shown in the condition (3), it is necessary that $d_{567}/f$ be smaller than 0.23.

Next, in order to keep an oblique beam of light symmetrical, the fourth lens component in the rear dispersive lens group is formed in a tightly curved meniscus shape. However, in order to make the telephoto ratio small as explained above, $f/f_{45}$ is made smaller than $-0.35$ and, as the power of the rear lens group is increased, the absolute value of the radius of curvature of the surface of the fourth lens component at the object side becomes small and the bulging of the axial spherical aberration becomes large with a consequence of a marked deterioration of the lens characteristics on the axis. Therefore, in order to prevent the deterioration of the lens characteristics on the axis, it is desirable that $f/f_{45}$ should be kept larger than $-1.3$ while $|r_7|/f$ is made larger than 0.15. When $f/f_{45}$ becomes smaller than $-1.3$, the lens characteristics on the axis will deteriorate.

In the photographic lens system according to the present invention, a high power dispersive lens group is adopted as the rear lens group having a large angular field of view wider than 60° and, thus, when an angular field of view becomes large, there occurs a great distortion of the positive value. According to the present invention, for the purpose of preventing the occurence of the distortion, the rear lens group consists of a negative meniscus lens and a positive meniscus lens, and it is so designed that the distortion is made small by this positive meniscus lens. If $d_8$ is made large in order to make the total length of the lens system small, the diameter of the positive meniscus lens becomes very large and its thickness unavoidably becomes thick. It is desirable that $d_8/f$ be smaller than 0.14 in this point.

In the photographic lens system according to the present invention explained above, it is preferable that the air space $d_6$ between the two lens elements as of the third lens component is so made as to satisfy the following condition:

$$d_6 \geq 0.05f \quad (5)$$

This condition (5) is to define the space between the two lens elements of the third lens component and is a condition required to arrange a stop mechanism between the two lens elements.

If the lower limit of this condition (5) is exceeded, it will be difficult to secure an air space large enough to arrange the stop mechanism.

It is preferable in correcting the abberations and particularly in reducing the curvature of field and the spherical abberation to satisfy the following condition (6) as well as the above respective conditions:

$$1.1 < f/f_3 < 1.9 \quad (6)$$

wherein the symbol $f_3$ represents the focal length of the third lens component.

In this condition (6), if the upper limit is exceeded, the spherical abberation will be corrected short and the curvature of field will become large and, on the other hand, if the lower limit is exceeded, the spherical abberation will be corrected in excess and the telephoto ratio will become so large as to be undesirable.

Now, some preferred embodiments of the present invention relating to the photographic lens system as described above are given below:

Embodiment 1

| | | | |
|---|---|---|---|
| $r_1 = 31.354$ | $d_1 = 8.48$ | $n_1 = 1.7725$ | $v_1 = 49.66$ |
| $r_2 = 72.216$ | $d_2 = 3.81$ | | |
| $r_3 = -219.771$ | $d_3 = 2.93$ | $n_2 = 1.84666$ | $v_2 = 23.90$ |
| $r_4 = 88.278$ | $d_4 = 5.81$ | | |
| $r_5 = 62.729$ | $d_5 = 5.87$ | $n_3 = 1.72$ | $v_3 = 43.7$ |
| $r_6 = -159.925$ | $d_6 = 6.57$ | | |
| $r_7 = -154.973$ | $d_7 = 5.87$ | $n_4 = 1.74$ | $v_4 = 28.29$ |
| $r_8 = -208.075$ | $d_8 = 11.53$ | | |
| $r_9 = -19.275$ | $d_9 = 3.52$ | $n_5 = 1.68893$ | $v_5 = 31.08$ |
| $r_{10} = -40.914$ | $d_{10} = 2.85$ | | |
| $r_{11} = -156.170$ | $d_{11} = 10.27$ | $n_6 = 1.80518$ | $v_6 = 25.43$ |
| $r_{12} = -70.171$ | | | |

$f = 100$, $f/f_{123} = 1.565$, $f/f_{45} = -0.9$
$d_{567}/f = 0.183$, $(\frac{1}{2})(n_2 + n_4) = 1.7$, Telephoto Ratio 1.01

Embodiment 2

| | | | |
|---|---|---|---|
| $r_1 = 31.578$ | $d_1 = 8.48$ | $n_1 = 1.7725$ | $v_1 = 49.66$ |
| $r_2 = 68.578$ | $d_2 = 3.82$ | | |
| $r_3 = -198.509$ | $d_3 = 2.93$ | $n_2 = 1.93169$ | $v_2 = 25.71$ |
| $r_4 = 105.540$ | $d_4 = 6.93$ | | |
| $r_5 = 56.671$ | $d_5 = 5.87$ | $n_3 = 1.7213$ | $v_3 = 51.49$ |
| $r_6 = -173.290$ | $d_6 = 6.57$ | | |
| $r_7 = -156.136$ | $d_7 = 5.87$ | $n_4 = 1.72273$ | $v_4 = 29.51$ |
| $r_8 = -155.55$ | $d_8 = 11.29$ | | |
| $r_9 = -19.942$ | $d_9 = 3.52$ | $n_5 = 1.6985$ | $v_5 = 27.51$ |
| $r_{10} = -44.733$ | $d_{10} = 2.63$ | | |
| $r_{11} = -222.725$ | $d_{11} = 10.27$ | $n_6 = 1.80518$ | $v_6 = 25.43$ |
| $r_{12} = -94.427$ | | | |

$f = 100$, $f/f_{123} = 1.637$, $f/f_{45} = -1.17$
$d_{567}/f = 0.183$, $(\frac{1}{2})(n_3 + n_4) = 1.722$, Telephoto Ratio 1.01

Embodiment 3

| | | | |
|---|---|---|---|
| $r_1 = 33.488$ | $d_1 = 8.48$ | $n_1 = 1.7725$ | $v_1 = 49.66$ |
| $r_2 = 98.251$ | $d_2 = 3.81$ | | |
| $r_3 = -156.093$ | $d_3 = 2.93$ | $n_2 = 1.84666$ | $v_2 = 23.90$ |
| $r_4 = 92.620$ | $d_4 = 7.67$ | | |
| $r_5 = 61.880$ | $d_5 = 7.54$ | $n_3 = 1.72$ | $v_3 = 43.70$ |
| $r_6 = -140.099$ | $d_6 = 6.57$ | | |
| $r_7 = -540.991$ | $d_7 = 5.87$ | $n_4 = 1.68402$ | $v_4 = 28.29$ |
| $r_8 = -256.861$ | $d_8 = 11.61$ | | |
| $r_9 = -20.336$ | $d_9 = 3.52$ | $n_5 = 1.94514$ | $v_5 = 31.08$ |
| $r_{10} = -56.175$ | $d_{10} = 2.78$ | | |
| $r_{11} = -89.075$ | $d_{11} = 10.77$ | $n_6 = 1.80518$ | $v_6 = 25.43$ |
| $r_{12} = -42.499$ | | | |

$f = 100$, $f/f_{123} = 1.764$, $f/f_{45} = -1.235$
$d_{567}/f = 0.2$, $(\frac{1}{2})(n_3 + n_4) = 1.70201$, Telephoto Ratio 1.01

Embodiment 4

| | | | |
|---|---|---|---|
| $r_1 = 30.479$ | $d_1 = 8.8$ | $n_1 = 1.7725$ | $v_1 = 49.66$ |
| $r_2 = 68.701$ | $d_2 = 3.81$ | | |
| $r_3 = -264.501$ | $d_3 = 2.93$ | $n_2 = 1.78472$ | $v_2 = 25.71$ |
| $r_4 = 79.532$ | $d_4 = 4.99$ | | |
| $r_5 = 67.070$ | $d_5 = 5.86$ | $n_3 = 1.734$ | $v_3 = 51.49$ |
| $r_6 = -186.309$ | $d_6 = 6.57$ | | |
| $r_7 = -130.201$ | $d_7 = 5.86$ | $n_4 = 1.71736$ | $v_4 = 29.51$ |
| $r_8 = -167.036$ | $d_8 = 10.62$ | | |
| $r_9 = -18.965$ | $d_9 = 3.52$ | $n_5 = 1.7552$ | $v_5 = 27.51$ |
| $r_{10} = -40.583$ | $d_{10} = 2.63$ | | |
| $r_{11} = -153.974$ | $d_{11} = 10.26$ | $n_6 = 1.80518$ | $v_6 = 25.43$ |
| $r_{12} = -57.795$ | | | |

$f = 100$, $f/f_{123} = 1.588$, $f/f_{45} = -0.785$
$d_{567}/f = 0.183$, $(\frac{1}{2})(n_3 + n_4) = 1.7257$, Telephoto Ratio 1.01

Embodiment 5

| | | | |
|---|---|---|---|
| $r_1 = 31.013$ | $d_1 = 8.49$ | $n_1 = 1.757$ | $v_1 = 47.87$ |
| $r_2 = 72.947$ | $d_2 = 3.81$ | | |
| $r_3 = -172.818$ | $d_3 = 2.93$ | $n_2 = 1.84666$ | $v_2 = 23.9$ |
| $r_4 = 94.594$ | $d_4 = 5.87$ | | |
| $r_5 = 65.779$ | $d_5 = 5.87$ | $n_3 = 1.7432$ | $v_3 = 49.31$ |
| $r_6 = -152.193$ | $d_6 = 6.57$ | | |
| $r_7 = -414.220$ | $d_7 = 5.87$ | $n_4 = 1.78472$ | $v_4 = 25.71$ |
| $r_8 = -378.671$ | $d_8 = 11.18$ | | |
| $r_9 = -19.239$ | $d_9 = 3.52$ | $n_5 = 1.7495$ | $v_5 = 35.27$ |
| $r_{10} = -44.182$ | $d_{10} = 2.05$ | | |
| $r_{11} = -95.013$ | $d_{11} = 10.26$ | $n_6 = 1.71736$ | $v_6 = 29.51$ |
| $r_{12} = -48.650$ | | | |

$f = 100$, $f/f_{123} = 1.647$, $f/f_{45} = -1.003$
$d_{567}/f = 0.183$, $(\frac{1}{2})(n_3 + n_4) = 1.764$, Telephoto Ratio 1.01

Embodiment 6

| | | | |
|---|---|---|---|
| $r_1 = 31.066$ | $d_1 = 8.48$ | $n_1 = 1.757$ | $v_1 = 47.87$ |

-continued

| | | | |
|---|---|---|---|
| $r_2 = 73.914$ | $d_2 = 3.81$ | | |
| $r_3 = -181.540$ | $d_3 = 2.93$ | $n_2 = 1.84666$ | $\nu_2 = 23.9$ |
| $r_4 = 96.835$ | $d_4 = 6.29$ | | |
| $r_5 = 68.317$ | $d_5 = 5.87$ | $n_3 = 1.7432$ | $\nu_3 = 49.31$ |
| $r_6 = -154.517$ | $d_6 = 6.57$ | | |
| $r_7 = 5221.1$ | $d_7 = 5.87$ | $n_4 = 1.84666$ | $\nu_4 = 23.9$ |
| $r_8 = 1323.47$ | $d_8 = 10.89$ | | |
| $r_9 = -19.185$ | $d_9 = 3.52$ | $n_5 = 1.7495$ | $\nu_5 = 35.27$ |
| $r_{10} = -41.262$ | $d_{10} = 2.05$ | | |
| $r_{11} = -104.096$ | $d_{11} = 10.26$ | $n_6 = 1.71736$ | $\nu_6 = 29.51$ |
| $r_{12} = -52.305$ | | | |
| $f = 100$, | | $f/f_{123} = 1.6155$ | |
| $f/f_{45} = -0.962$, | | $d_{567}/f = 0.183$ | |
| $(\frac{1}{2})(n_3 + n_4) = 1.79493$, Telephoto Ratio 1.01 | | | |

Embodiment 7

| | | | |
|---|---|---|---|
| $r_1 = 30.469$ | $d_1 = 8.86$ | $n_1 = 1.7784$ | $\nu_1 = 44.18$ |
| $r_2 = 67.019$ | $d_2 = 3.81$ | | |
| $r_3 = -247.114$ | $d_3 = 2.93$ | $n_2 = 1.80518$ | $\nu_2 = 25.43$ |
| $r_4 = 73.523$ | $d_4 = 5.62$ | | |
| $r_5 = 57.258$ | $d_5 = 5.87$ | $n_3 = 1.72916$ | $\nu_3 = 54.68$ |
| $r_6 = -187.767$ | $d_6 = 6.57$ | | |
| $r_7 = -102.102$ | $d_7 = 5.87$ | $n_4 = 1.7432$ | $\nu_4 = 49.31$ |
| $r_8 = -103.164$ | $d_8 = 10.28$ | | |
| $r_9 = -19.798$ | $d_9 = 3.52$ | $n_5 = 1.8044$ | $\nu_5 = 39.62$ |
| $r_{10} = -43.509$ | $d_{10} = 2.63$ | | |
| $r_{11} = -189.385$ | $d_{11} = 10.26$ | $n_6 = 1.80518$ | $\nu_6 = 25.43$ |
| $r_{12} = -66.874$ | | | |
| $f = 100$, | | $f/f_{123} = 1.634$ | |
| $f/f_{45} = -1.01$, | | $d_{567}/f = 0.183$ | |
| $(\frac{1}{2})(n_3 + n_4) = 1.7362$, Telephoto Ratio 1.01 | | | |

Embodiment 8

| | | | |
|---|---|---|---|
| $r_1 = 30.238$ | $d_1 = 8.66$ | $n_1 = 1.788$ | $\nu_1 = 47.73$ |
| $r_2 = 82.595$ | $d_2 = 3.81$ | | |
| $r_3 = -377.282$ | $d_3 = 2.93$ | $n_2 = 1.78472$ | $\nu_2 = 25.71$ |
| $r_4 = 51.023$ | $d_4 = 3.40$ | | |
| $r_5 = 68.014$ | $d_5 = 5.87$ | $n_3 = 1.744$ | $\nu_3 = 44.73$ |
| $r_6 = -140.747$ | $d_6 = 6.57$ | | |
| $r_7 = -76.199$ | $d_7 = 5.87$ | $n_4 = 1.71736$ | $\nu_4 = 29.51$ |
| $r_8 = -110.950$ | $d_8 = 12.30$ | | |
| $r_9 = -19.034$ | $d_9 = 3.52$ | $n_5 = 1.7552$ | $\nu_5 = 27.51$ |
| $r_{10} = -35.414$ | $d_{10} = 3.23$ | | |
| $r_{11} = -276.719$ | $d_{11} = 9.38$ | $n_6 = 1.80518$ | $\nu_6 = 25.43$ |
| $r_{12} = -67.141$ | | | |
| $f = 100$, | | $f/f_{123} = 1.42$ | |
| $f/f_{45} = -0.512$, | | $d_{567}/f = 0.183$ | |
| $(\frac{1}{2})(n_3 + n_4) = 1.7307$, Telephoto Ratio 1.01 | | | |

Embodiment 9

| | | | |
|---|---|---|---|
| $r_1 = 30.552$ | $d_1 = 8.89$ | $n_1 = 1.7725$ | $\nu_1 = 49.66$ |
| $r_2 = 73.956$ | $d_2 = 3.81$ | | |
| $r_3 = -326.281$ | $d_3 = 2.93$ | $n_2 = 1.78472$ | $\nu_2 = 25.71$ |
| $r_4 = 66.084$ | $d_4 = 4.67$ | | |
| $r_5 = 65.346$ | $d_5 = 5.87$ | $n_3 = 1.734$ | $\nu_3 = 51.49$ |
| $r_6 = -164.366$ | $d_6 = 6.57$ | | |
| $r_7 = -103.793$ | $d_7 = 5.87$ | $n_4 = 1.71736$ | $\nu_4 = 29.51$ |
| $r_8 = -192.764$ | $d_8 = 11.16$ | | |
| $r_9 = -18.752$ | $d_9 = 3.52$ | $n_5 = 1.7552$ | $\nu_5 = 27.51$ |
| $r_{10} = -33.650$ | $d_{10} = 2.63$ | | |
| $r_{11} = -331.022$ | $d_{11} = 10.26$ | $n_6 = 1.80518$ | $\nu_6 = 25.43$ |
| $r_{12} = -80.302$ | | | |
| $f = 100$, | $f/f_{123} = 1.456$, | $f/f_{45} = -0.642$ | |
| $d_{567}/f = 0.183$, $(\frac{1}{2})(n_3 + n_4) = 1.7257$, Telephoto Ratio 1.01 | | | | wherein the symbols $r_1$ through $r_{12}$ represent the radii of curvature of the respective lens surfaces, the symbols $d_1$ through $d_{11}$ represent the axial thickness of the respective lenses and axial air spaces between the lenses, the symbols $n_1$ through $n_6$ represent the refractive indices of the respective lenses, and the symbol $\nu_1$ through $\nu_6$ represent the Abbe's numbers of the respective lenses, respectively.

The Saider's abberation coefficients of the above respective embodiments are as follows:

| | Spherical Abberation | Astigmatism | Coma | Distortion | Petzval |
|---|---|---|---|---|---|
| | | Embodiment 1 | | | |
| 1 | 7.9769 | 0.0000 | 0.0044 | 0.0008 | 1.3900 |
| 2 | 0.0579 | 0.9518 | −0.2347 | −1.4126 | −0.6035 |
| 3 | −3.4559 | −2.4766 | 2.9255 | 2.2732 | −0.2086 |
| 4 | 0.0145 | 0.0834 | 0.0348 | −1.0449 | −0.5194 |
| 5 | 0.0091 | 0.0202 | 0.0136 | 1.0220 | 0.6673 |
| 6 | 3.9772 | 1.8038 | −2.6784 | −1.3910 | 0.2618 |
| 7 | −3.2117 | −1.4109 | 2.1287 | 1.1170 | −0.2744 |
| 8 | 2.1987 | 1.1714 | −1.6049 | −1.0042 | 0.2044 |
| 9 | −8.0335 | −0.0018 | −1.1196 | −0.0315 | −2.1163 |
| 10 | 0.9450 | 0.3248 | −0.5540 | −0.7748 | 0.9970 |
| 11 | −0.2508 | −0.5926 | 0.3855 | 1.3498 | −0.2856 |
| 12 | 0.6076 | 0.1596 | −0.3114 | −0.4075 | 0.6356 |
| | 0.8351 | 0.0331 | −0.0104 | −0.3038 | 0.1483 |
| | | Embodiment 2 | | | |
| 1 | 7.8100 | 0.0008 | −0.0775 | −0.0137 | 1.3802 |
| 2 | 0.0160 | 0.8235 | −0.1148 | −1.3475 | −0.6356 |
| 3 | −3.3720 | −2.5284 | 2.9199 | 2.3998 | −0.2430 |
| 4 | 0.0090 | 0.0664 | 0.0244 | −1.0640 | −0.4570 |
| 5 | 0.0928 | 0.1185 | 0.1049 | 0.9694 | 0.7395 |
| 6 | 3.8783 | 1.7753 | −2.6239 | −1.3647 | 0.2418 |
| 7 | −3.2240 | −1.3882 | 2.1156 | 1.0873 | −0.2687 |
| 8 | 2.7984 | 1.1648 | −1.8054 | −0.9255 | 0.2697 |
| 9 | −8.3116 | −0.0000 | 0.0057 | 0.0014 | −2.0624 |
| 10 | 0.9215 | 0.3770 | −0.5894 | −0.8293 | 0.9194 |
| 11 | −0.2452 | −0.6546 | 0.4007 | 1.3969 | −0.2004 |
| 12 | 0.4758 | 0.2831 | −0.3670 | −0.5828 | 0.4724 |
| | 0.8488 | 0.0381 | −0.0071 | −0.2728 | 0.1561 |

I claim:

1. A photographic lens system comprising a first lens component of a positive meniscus lens with its convex surface on the object side, a second lens component of biconcave lens, a third lens component consisting of a biconvex lens and a small power positive or negative lens located adjacent the biconcave lens with an air space and having a positive refracting power as a whole, a fourth lens component of a negative meniscus lens with tis convex surface on the image side, and a fifth lens component of a positive meniscus lens with a convex surface on the image side, said lens system satisfying the following conditions:

$$1.2 < f/f_{123} < 1.8 \tag{1}$$

$$-1.3 < f/f_{45} < -0.35 \tag{2}$$

$$0.16 < d_{567}/f < 0.23 \tag{3}$$

$$0.09 < d_i/f < 0.14 \tag{4}$$

wherein the reference symbol $f_{123}$ represents the composite focal length of the first, second and third lens components, the symbol $f_{45}$ represents the composite focal length of the fourth and fifth lens component, the symbol $d_{567}$ represents the length $(d_5 + d_6 + d_7)$ from the object side surface to the image side surface of the third lens component, the symbol $d_8$ represents the axial air space between the third and fourth lens components, and the symbol $f$ represents the focal length of the entire lens system.

2. A photographic lens system according to claim 1, further satisfying the following condition:

$$d_6 \geq 0.05f \tag{5}$$

wherein the reference symbol $d_6$ represents the axial air space between the two lens elements as of the third lens component.

3. A photographic lens system according to claim 1 or 2 further satisfying the following condition:

$$1.1 < f/f_3 < 1.9 \quad (6)$$

wherein the reference symbol $f_3$ represents the focal length of the third lens component.

4. A photographic lens system according to claim 3 having the following data:

| | | | |
|---|---|---|---|
| $r_1 = 31.354$ | $d_1 = 8.48$ | $n_1 = 1.7725$ | $\nu_1 = 49.66$ |
| $r_2 = 72.216$ | $d_2 = 3.81$ | | |
| $r_3 = -219.771$ | $d_3 = 2.93$ | $n_2 = 1.84666$ | $\nu_2 = 23.90$ |
| $r_4 = 88.278$ | $d_4 = 5.81$ | | |
| $r_5 = 62.729$ | $d_5 = 5.87$ | $n_3 = 1.72$ | $\nu_3 = 43.7$ |
| $r_6 = -159.925$ | $d_6 = 6.57$ | | |
| $r_7 = -154.973$ | $d_7 = 5.87$ | $n_4 = 1.74$ | $\nu_4 = 28.29$ |
| $r_8 = -208.075$ | $d_8 = 11.53$ | | |
| $r_9 = -19.275$ | $d_9 = 3.52$ | $n_5 = 1.68893$ | $\nu_5 = 31.08$ |
| $r_{10} = -40.914$ | $d_{10} = 2.85$ | | |
| $r_{11} = -156.170$ | $d_{11} = 10.27$ | $n_6 = 1.80518$ | $\nu_6 = 25.43$ |
| $r_{12} = -70.171$ | | | |
| $f = 100$, | $f/f_{123} = 1.565$, | | $f/f_{45} = -0.9$ |
| $d_{567}/f = 0.183$, $(\frac{1}{2})(n_3 + n_4) = 1.7$, Telephoto Ratio 1.01 | | | | wherein the reference symbols $r_1$ through $r_{12}$ represent the radii of curvature of the respective lens surfaces, the symbols $d_1$ through $d_{11}$ represent the axial thickness of the respective lenses and axial air spaces between the lenses, the symbols $n_1$ through $n_6$ represent the refractive indices of the respective lenses, and the symbols $\nu_1$ through $\nu_6$ represent the Abbe's numbers of the respective lenses, respectively.

5. A photographic lens system according to claim 3 having the following data:

| | | | |
|---|---|---|---|
| $r_1 = 31.578$ | $d_1 = 8.48$ | $n_1 = 1.7725$ | $\nu_1 = 49.66$ |
| $r_2 = 68.578$ | $d_2 = 3.82$ | | |
| $r_3 = -198.509$ | $d_3 = 2.93$ | $n_2 = 1.93169$ | $\nu_2 = 25.71$ |
| $r_4 = 105.540$ | $d_4 = 6.93$ | | |
| $r_5 = 56.671$ | $d_5 = 5.87$ | $n_3 = 1.7213$ | $\nu_3 = 51.49$ |
| $r_6 = -173.290$ | $d_6 = 6.57$ | | |
| $r_7 = -156.136$ | $d_7 = 5.87$ | $n_4 = 1.72273$ | $\nu_4 = 29.51$ |
| $r_8 = -155.55$ | $d_8 = 11.29$ | | |
| $r_9 = -19.942$ | $d_9 = 3.52$ | $n_5 = 1.6985$ | $\nu_5 = 27.51$ |
| $r_{10} = -44.733$ | $d_{10} = 2.63$ | | |
| $r_{11} = -222.725$ | $d_{11} = 10.27$ | $n_6 = 1.80518$ | $\nu_6 = 25.43$ |
| $r_{12} = -94.427$ | | | |
| $f = 100$, | $f/f_{123} = 1.637$, | | $f/f_{45} = -1.17$ |
| $d_{567}/f = 0.183$, $(\frac{1}{2})(n_3 + n_4) = 1.722$, Telephoto Ratio 1.01 | | | | wherein the reference symbols $r_1$ through $r_{12}$ represent the radii of curvature of the respective lens surfaces, the symbols $d_1$ through $d_{11}$ represent the axial thickness of the respective lenses and axial air spaces between the lenses, the symbols $n_1$ through $n_6$ represent the refractive indices of the respective lenses, and the symbols $\nu_1$ through $\nu_6$ represent the Abbe's numbers of the respective lenses, respectively.

6. A photographic lens system according to claim 3 having the following data:

| | | | |
|---|---|---|---|
| $r_1 = 33.488$ | $d_1 = 8.48$ | $n_1 = 1.7725$ | $\nu_1 = 49.66$ |
| $r_2 = 98.251$ | $d_2 = 3.81$ | | |
| $r_3 = -156.093$ | $d_3 = 2.93$ | $n_2 = 1.84666$ | $\nu_2 = 23.90$ |
| $r_4 = 92.620$ | $d_4 = 7.67$ | | |
| $r_5 = 61.880$ | $d_5 = 7.54$ | $n_3 = 1.72$ | $\nu_3 = 43.70$ |
| $r_6 = -140.099$ | $d_6 = 6.57$ | | |
| $r_7 = -540.991$ | $d_7 = 5.87$ | $n_4 = 1.68402$ | $\nu_4 = 28.29$ |
| $r_8 = -256.861$ | $d_8 = 11.61$ | | |
| $r_9 = -20.336$ | $d_9 = 3.52$ | $n_5 = 1.94514$ | $\nu_5 = 31.08$ |
| $r_{10} = -56.175$ | $d_{10} = 2.78$ | | |
| $r_{11} = -89.075$ | $d_{11} = 10.77$ | $n_6 = 1.80518$ | $\nu_6 = 25.43$ |
| $r_{12} = -42.499$ | | | |
| $f = 100$, | $f/f_{123} = 1.764$, | | $f/f_{45} = -1.235$ |
| $d_{567}/f = 0.2$, $(\frac{1}{2})(n_3 + n_4) = 1.70201$, Telephoto Ratio 1.01 | | | | wherein the reference symbols $r_1$ through $r_{12}$ represent the radii of curvature of the respective lens surfaces, the symbols $d_1$ through $d_{11}$ represent the axial thickness of the respective lenses and axial air spaces between the lenses, the symbols $n_1$ through $n_6$ represent the refractive indices of the respective lenses, and the symbols $\nu_1$ through $\nu_6$ represent the Abbe's numbers of the respective lenses, respectively.

7. A photographic lens system according to claim 3 having the following data:

| | | | |
|---|---|---|---|
| $r_1 = 30.479$ | $d_1 = 8.8$ | $n_1 = 1.7725$ | $\nu_1 = 49.66$ |
| $r_2 = 68.701$ | $d_2 = 3.81$ | | |
| $r_3 = -264.501$ | $d_3 = 2.93$ | $n_2 = 1.78472$ | $\nu_2 = 25.71$ |
| $r_4 = 79.532$ | $d_4 = 4.99$ | | |
| $r_5 = 67.070$ | $d_5 = 5.86$ | $n_3 = 1.734$ | $\nu_3 = 51.49$ |
| $r_6 = -186.309$ | $d_6 = 6.57$ | | |
| $r_7 = -130.201$ | $d_7 = 5.86$ | $n_4 = 1.71736$ | $\nu_4 = 29.51$ |
| $r_8 = -167.036$ | $d_8 = 10.62$ | | |
| $r_9 = -18.965$ | $d_9 = 3.52$ | $n_5 = 1.7552$ | $\nu_5 = 27.51$ |
| $r_{10} = -40.583$ | $d_{10} = 2.63$ | | |
| $r_{11} = -153.974$ | $d_{11} = 10.26$ | $n_6 = 1.80518$ | $\nu_6 = 25.43$ |
| $r_{12} = -57.795$ | | | |
| $f = 100$, | $f/f_{123} = 1.558$, | | $f/f_{45} = -0.785$ |
| $d_{567}/f = 0.183$, $(\frac{1}{2})(n_3 + n_4) = 1.7257$, Telephoto Ratio 1.01 | | | | wherein the reference symbols $r_1$ through $r_{12}$ represent the radii of curvature of the respective lens surfaces, the symbols $d_1$ through $d_{11}$ represent the axial thickness of the respective lenses and axial air spaces between the lenses, the symbols $n_1$ through $n_6$ represent the refractive indices of the respective lenses, and the symbols $\nu_1$ through $\nu_6$ represent the Abbe's numbers of the respective lenses, respectively.

8. A photographic lens system according to claim 3 having the following data:

| | | | |
|---|---|---|---|
| $r_1 = 31.013$ | $d_1 = 8.49$ | $n_1 = 1.757$ | $\nu_1 = 47.87$ |
| $r_2 = 72.947$ | $d_2 = 3.81$ | | |
| $r_3 = -172.818$ | $d_3 = 2.93$ | $n_2 = 1.84666$ | $\nu_2 = 23.9$ |
| $r_4 = 94.594$ | $d_4 = 5.87$ | | |
| $r_5 = 65.779$ | $d_5 = 5.87$ | $n_3 = 1.7432$ | $\nu_3 = 49.31$ |
| $r_6 = -152.193$ | $d_6 = 6.57$ | | |
| $r_7 = -414.220$ | $d_7 = 5.87$ | $n_4 = 1.78472$ | $\nu_4 = 25.71$ |
| $r_8 = -378.671$ | $d_8 = 11.18$ | | |
| $r_9 = -19.239$ | $d_9 = 3.52$ | $n_5 = 1.7495$ | $\nu_5 = 35.27$ |
| $r_{10} = -44.182$ | $d_{10} = 2.05$ | | |
| $r_{11} = -95.013$ | $d_{11} = 10.26$ | $n_6 = 1.71736$ | $\nu_6 = 29.51$ |
| $r_{12} = -48.650$ | | | |
| $f = 100$, | $f/f_{123} = 1.647$, | | $f/f_{45} = -1.003$ |
| $d_{567}/f = 0.183$, $(\frac{1}{2})(n_3 + n_4) = 1.764$, Telephoto Ratio 1.01 | | | | wherein the reference symbols $r_1$ through $r_{12}$ represent the radii of curvature of the respective lens surfaces, the symbols $d_1$ through $d_{11}$ represent the axial thickness of the respective lenses and axial air spaces between the lenses, the symbols $n_1$ through $n_6$ represent the refractive indices of the respective lenses, and the symbols $\nu_1$ through $\nu_6$ represent the Abbe's numbers of the respective lenses, respectively.

9. A photographic lens system according to claim 3 having the following data:

| | | | |
|---|---|---|---|
| $r_1 = 31.066$ | $d_1 = 8.48$ | $n_1 = 1.757$ | $\nu_1 = 47.87$ |

-continued

| | | | |
|---|---|---|---|
| $r_2 = 73.914$ | $d_2 = 3.81$ | | |
| $r_3 = -181.540$ | $d_3 = 2.93$ | $n_2 = 1.84666$ | $v_2 = 23.9$ |
| $r_4 = 96.835$ | $d_4 = 6.29$ | | |
| $r_5 = 68.317$ | $d_5 = 5.87$ | $n_3 = 1.7432$ | $v_3 = 49.31$ |
| $r_6 = -154.517$ | $d_6 = 6.57$ | | |
| $r_7 = 5221.1$ | $d_7 = 5.87$ | $n_4 = 1.84666$ | $v_4 = 23.9$ |
| $r_8 = 1323.47$ | $d_8 = 10.89$ | | |
| $r_9 = -19.185$ | $d_9 = 3.52$ | $n_5 = 1.7495$ | $v_5 = 35.27$ |
| $r_{10} = -41.262$ | $d_{10} = 2.05$ | | |
| $r_{11} = -104.096$ | $d_{11} = 10.26$ | $n_6 = 1.71736$ | $v_6 = 29.51$ |
| $r_{12} = -52.305$ | | | |
| $f = 100$, | $f/f_{123} = 1.6155$, | $f/f_{45} = -0.962$ | |
| $d_{567}/f = 0.183$, $(\frac{1}{2})(n_3 + n_4) = 1.79493$, Telephoto Ratio 1.01 | | | | wherein the reference symbols $r_1$ through $r_{12}$ represent the radii of curvature of the respective lens surfaces, the symbols $d_1$ through $d_{11}$ represent the axial thickness of the respective lenses and axial air spaces between the lenses, the symbols $n_1$ through $n_6$ represent the refractive indices of the respective lenses, and the symbols $v_1$ through $v_6$ represent the Abbe's numbers of the respective lenses, respectively.

10. A photographic lens system according to claim 3 having the following data:

| | | | |
|---|---|---|---|
| $r_1 = 30.469$ | $d_1 = 8.86$ | $n_1 = 1.7784$ | $v_1 = 44.18$ |
| $r_2 = 67.019$ | $d_2 = 3.81$ | | |
| $r_3 = -247.114$ | $d_3 = 2.93$ | $n_2 = 1.80518$ | $v_2 = 25.43$ |
| $r_4 = 73.523$ | $d_4 = 5.62$ | | |
| $r_5 = 57.258$ | $d_5 = 5.87$ | $n_3 = 1.72916$ | $v_3 = 54.68$ |
| $r_6 = -187.767$ | $d_6 = 6.57$ | | |
| $r_7 = -102.102$ | $d_7 = 5.87$ | $n_4 = 1.7432$ | $v_4 = 49.31$ |
| $r_8 = -103.164$ | $d_8 = 10.28$ | | |
| $r_9 = -19.798$ | $d_9 = 3.52$ | $n_5 = 1.8044$ | $v_5 = 39.62$ |
| $r_{10} = -43.509$ | $d_{10} = 2.63$ | | |
| $r_{11} = -189.385$ | $d_{11} = 10.26$ | $n_6 = 1.80518$ | $v_6 = 25.43$ |
| $r_{12} = -66.874$ | | | |
| $f = 100$, | $f/f_{123} = 1.634$, | $f/f_{45} = -1.01$ | |
| $d_{567}/f = 0.183$, $(\frac{1}{2})(n_3 + n_4) = 1.7362$, Telephoto Ratio 1.01 | | | | wherein the reference symbols $r_1$ through $r_{12}$ represent the radii of curvature of the respective lens surfaces, the symbols $d_1$ through $d_{11}$ represent the axial thickness of the respective lenses and axial air spaces between the lenses, the symbols $n_1$ through $n_6$ represent the refractive indices of the respective lenses, and the symbols $v_1$ through $v_6$ represent the Abbe's numbers of the respective lenses, respectively.

11. A photographic lens system according to claim 3 having the following data:

| | | | |
|---|---|---|---|
| $r_1 = 30.238$ | $d_1 = 8.66$ | $n_1 = 1.788$ | $v_1 = 47.43$ |
| $r_2 = 82.595$ | $d_2 = 3.81$ | | |
| $r_3 = -377.282$ | $d_3 = 2.93$ | $n_2 = 1.78472$ | $v_2 = 25.71$ |
| $r_4 = 51.023$ | $d_4 = 3.40$ | | |
| $r_5 = 68.014$ | $d_5 = 5.87$ | $n_3 = 1.744$ | $v_3 = 44.73$ |
| $r_6 = -140.747$ | $d_6 = 6.57$ | | |
| $r_7 = -76.199$ | $d_7 = 5.87$ | $n_4 = 1.71736$ | $v_4 = 29.51$ |
| $r_8 = -110.950$ | $d_8 = 12.30$ | | |
| $r_9 = -19.034$ | $d_9 = 3.52$ | $n_5 = 1.7552$ | $v_5 = 27.51$ |
| $r_{10} = -35.414$ | $d_{10} = 3.23$ | | |
| $r_{11} = -276.719$ | $d_{11} = 9.38$ | $n_6 = 1.80518$ | $v_6 = 25.43$ |
| $r_{12} = -67.141$ | | | |
| $f = 100$, | $f/f_{123} = 1.42$ | $f/f_{45} = -0.512$ | |
| $d_{567}/f = 0.183$, $(\frac{1}{2})(n_3 + n_4) = 1.7307$, Telephoto Ratio 1.01 | | | | wherein the reference symbols $r_1$ through $r_{12}$ represent the radii of curvature of the respective lens surfaces, the symbols $d_1$ through $d_{11}$ represent the axial thickness of the respective lenses and axial air spaces between the lenses, the symbols $n_1$ through $n_6$ represent the refractive indices of the respective lenses, and the symbols $v_1$ through $v_6$ represent the Abbe's numbers of the respective lenses, respectively.

12. A photographic lens system according to claim 3 having the following data:

| | | | |
|---|---|---|---|
| $r_1 = 30.522$ | $d_1 = 8.89$ | $n_1 = 1.7725$ | $v_1 = 49.66$ |
| $r_2 = 73.956$ | $d_2 = 3.81$ | | |
| $r_3 = -326.281$ | $d_3 = 2.93$ | $n_2 = 1.78472$ | $v_2 = 25.71$ |
| $r_4 = 66.084$ | $d_4 = 4.67$ | | |
| $r_5 = 65.346$ | $d_5 = 5.87$ | $n_3 = 1.734$ | $v_3 = 51.49$ |
| $r_6 = -164.366$ | $d_6 = 6.57$ | | |
| $r_7 = -103.793$ | $d_7 = 5.87$ | $n_4 = 1.71736$ | $v_4 = 29.51$ |
| $r_8 = -192.764$ | $d_8 = 11.16$ | | |
| $r_9 = -18.752$ | $d_9 = 3.52$ | $n_5 = 1.7552$ | $v_5 = 27.51$ |
| $r_{10} = -33.650$ | $d_{10} = 2.63$ | | |
| $r_{11} = -331.022$ | $d_{11} = 10.26$ | $n_6 = 1.80518$ | $v_6 = 25.43$ |
| $r_{12} = -80.302$ | | | |
| $f = 100$, | $f/f_{123} = 1.456$, | $f/f_{45} = -0.642$ | |
| $d_{567}/f = 0.183$, $(\frac{1}{2})(n_3 + n_4) = 1.7257$, Telephoto Ratio 1.01 | | | | wherein the reference symbols $r_1$ through $r_{12}$ represent the radii of curvature of the respective lens surfaces, the symbols $d_1$ through $d_{11}$ represent the axial thickness of the respective lenses and axial air spaces between the lenses, the symbols $n_1$ through $n_6$ represent the refractive indices of the respective lenses, and the symbols $v_1$ through $v_6$ represent the Abbe's numbers of the respective lenses, respectively.

* * * * *